United States Patent
Liu et al.

(10) Patent No.: US 7,298,954 B2
(45) Date of Patent: Nov. 20, 2007

(54) WAVEGUIDE SHUTTLE MEMS VARIABLE OPTICAL ATTENUATOR

(75) Inventors: Xueyuan Liu, Webster, NY (US); Peter M. Gulvin, Webster, NY (US); Kristine A. German, Webster, NY (US); Yao Rong Wang, Webster, NY (US); Jun Ma, Penfield, NY (US); Pinyen Lin, Rochester, NY (US); Joel A. Kubby, Santa Cruz, CA (US); Kathleen A. Feinberg, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 57 days.

(21) Appl. No.: 11/154,019

(22) Filed: Jun. 16, 2005

(65) Prior Publication Data

US 2006/0291794 A1 Dec. 28, 2006

(51) Int. Cl.
G02B 6/26 (2006.01)
(52) U.S. Cl. .......................................... 385/140; 385/25
(58) Field of Classification Search .................... None
See application file for complete search history.

(56) References Cited

U.S. PATENT DOCUMENTS

| | | |
|---|---|---|
| 4,645,294 A | 2/1987 | Oguey et al. |
| 5,727,099 A | 3/1998 | Harman |
| 5,864,643 A | 1/1999 | Pan |
| 6,102,582 A | 8/2000 | Espindola et al. |
| 6,341,191 B1 * | 1/2002 | Takahashi .................... 385/140 |
| 6,628,882 B2 | 9/2003 | Vaganov et al. |
| 6,658,178 B2 | 12/2003 | Kasuga et al. |
| 6,801,682 B2 * | 10/2004 | Zhang et al. .................. 385/18 |
| 6,904,191 B2 | 6/2005 | Kubby |
| 6,980,727 B1 * | 12/2005 | Lin et al. .................... 385/140 |
| 2004/0062510 A1 | 4/2004 | Romo et al. |

(Continued)

FOREIGN PATENT DOCUMENTS

WO    WO 03/058286 A2 *    7/2003

OTHER PUBLICATIONS

A. Unamuno et al. MEMS variable optical attenuator with vernier latching mechanism. IEEE Photonics Technology Letters, 18(1), pp. 88-90, Jan. 2006.*
Pinyen Lin et al., U.S. Appl. No. 11/010,769, filed Dec. 13, 2004, entitled "Cantilever Beam MEMS Variable Optical Attenuator".
Pinyen Lin et al., U.S. Appl. No. 11/010,768, filed Dec. 13, 2004, entitled "Methodology for a MEMS Variable Optical Attenuator".
Pinyen Lin et al., U.S. Appl. No. 10/995,965, filed Nov. 23, 2004, entitled "Microfabrication Process for Control of Waveguide Gap Size".

*Primary Examiner*—Rodney Bovernick
*Assistant Examiner*—Mike Stahl
(74) *Attorney, Agent, or Firm*—Christopher D. Wait

(57) ABSTRACT

An improved waveguide shuttle optical switch design which provides the function of a variable optical attenuator (VOA). A small degree of intentional misalignment of the waveguide will create different levels of optical attenuation. By finely controlling the misalignment of a selected switched position, a single device may be realized that will provide the functions of both switching and attenuating or just attenuation alone. The optical MEMS device utilizes a latching mechanism in association with a thermal drive actuator for aligning a waveguide shuttle platform. The integration of the switching function and the VOA function reduce the optical loss which is otherwise unavoidable when the inevitable alternative of a separate switch and a separate VOA must necessarily be employed. The resultant improved device can also be applied for correcting the difference in optical intensity created by the manufacturing tolerances inherent in the fabrication of array waveguide gratings.

18 Claims, 17 Drawing Sheets

U.S. PATENT DOCUMENTS

2004/0184709 A1    9/2004   Kubby et al.
2004/0184710 A1    9/2004   Kubby et al.
2004/0223717 A1    11/2004  Romo et al.
2004/0264907 A1*   12/2004  Lee et al. .................. 385/140

* cited by examiner

FIG. 13
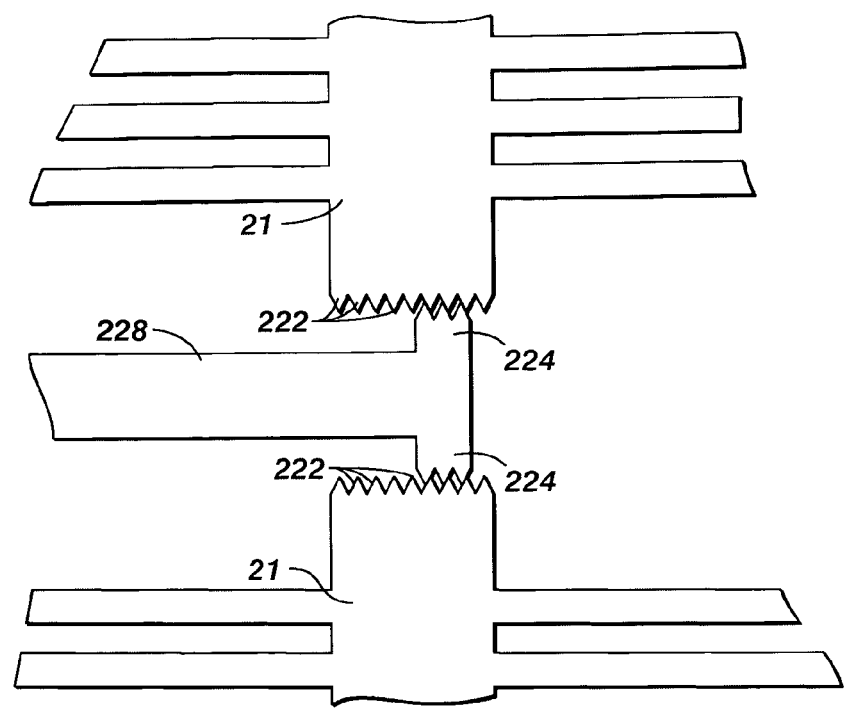
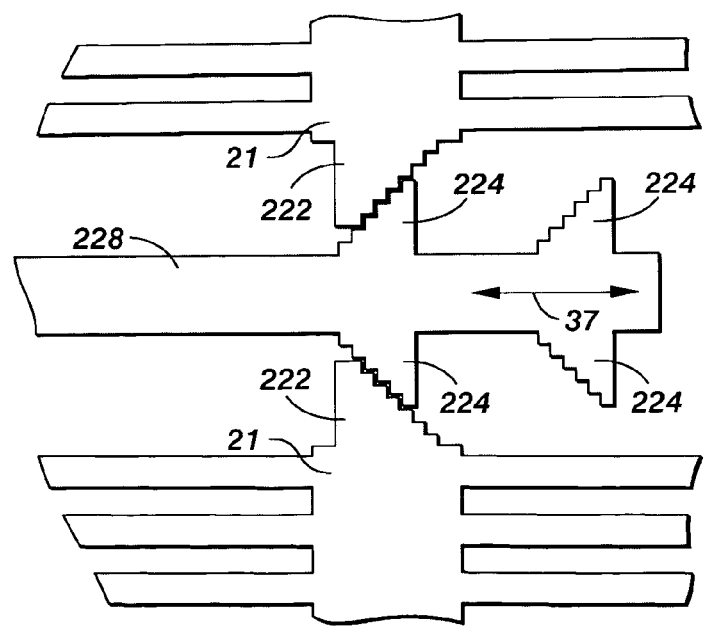
FIG. 14

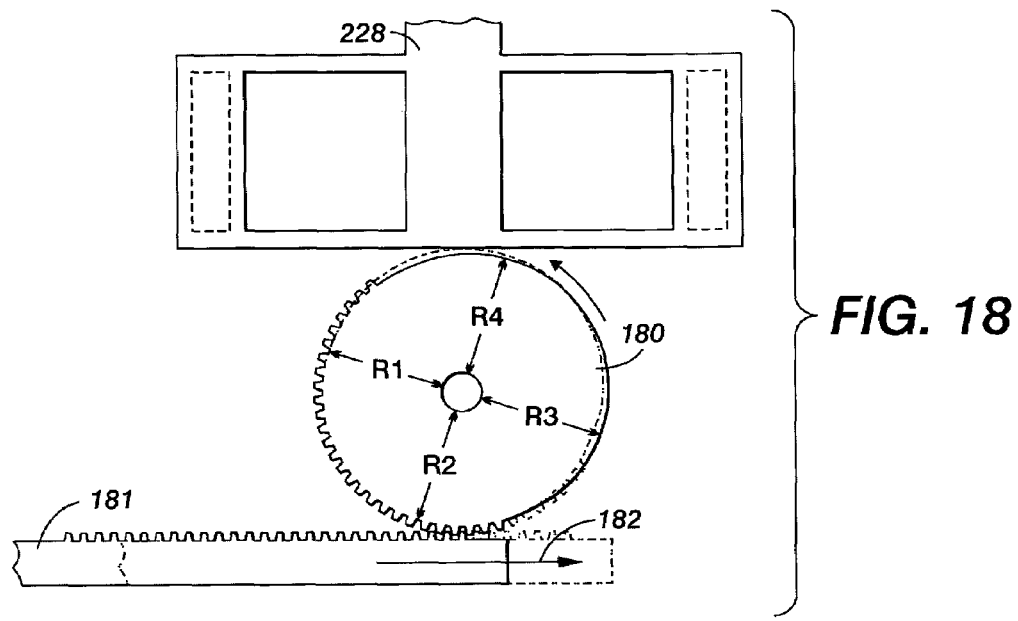
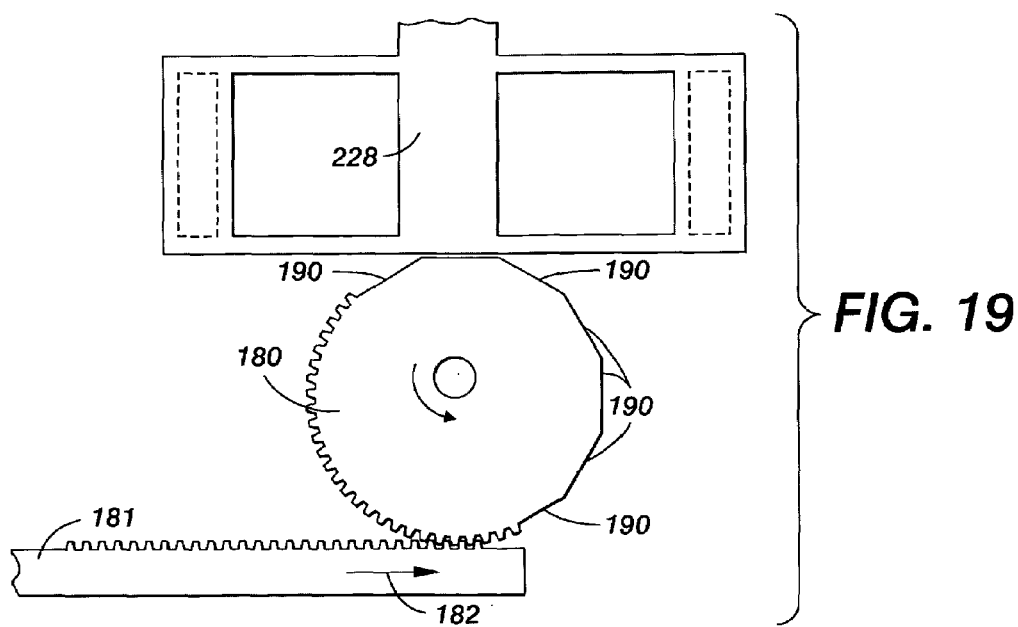
FIG. 18
FIG. 19

WAVEGUIDE SHUTTLE MEMS VARIABLE OPTICAL ATTENUATOR

CROSS-REFERENCE TO RELATED APPLICATIONS

Attention is directed to copending applications: U.S. application Ser. No. 11,010,769, entitled "Cantilever Beam MEMS Variable Optical Attenuator", U.S. application Ser. No. 11,010,768, entitled, "Methodology For A MEMS Variable Optical Attenuator", U.S. Pat. No. 6,904,191, entitled, "MxN Cantilever Beam Optical Waveguide Switch", US Publication No. 2004/0184709, published Sep. 23, 2004, entitled, "MEMS Waveguide Shuttle Optical Latching Switch", and US Publication No. 2004/0184710, published Sep. 23, 2004, entitled, "MEMS Optical Latching Switch". Attention is further directed to copending application U.S. application Ser. No. 10/995,965, entitled "Microfabrication Process for Control of Waveguide Gap Size". The disclosure found in each of these copending applications is hereby incorporated by reference in its entirety.

BACKGROUND AND SUMMARY

The embodiments disclosed herein relate generally to micro-electro-mechanical system (MEMS) attenuators and more particularly to variable optical attenuators.

The telecommunications industry is undergoing dramatic changes with increased competition, relentless bandwidth demand, and a migration toward more data-centric network architectures. First generation point-to-point wave division multiplex systems have eased the traffic bottleneck in the backbone portion of a network. As a new cross-connect architecture moves the technology closer to the subscriber side of the network, operators are challenged to provide services at the optical layer, calling for more flexible networks that switch, attenuate and reroute wavelengths. This is placing great emphasis and demand for wavelength agile devices.

The need to provide services "just in time" by allocation of wavelengths, and further migration of the optical layer from the high-capacity backbone portion to the local loop, is driving the transformation of the network toward an all optical network in which basic network requirements will be performed in the optical layer.

The optical network is a natural evolution of point-to-point dense wavelength division multiplexing (DWDM) transport to a more dynamic, flexible, and intelligent networking architecture to improve service delivery time. The main element of the optical network is the wavelength (channel), which will be provisioned, configured, routed, attenuated and managed in the optical domain. Intelligent optical networking will be first deployed as an "opaque" network in which periodic optical-electrical conversion will be required to monitor and isolate signal impairments. Longer range, the optical network will evolve to a "transparent" optical network in which a signal is transported from its source to a destination entirely within the optical domain.

A key element of the emerging optical network is an optical add/drop multiplexer (OADM). An OADM will drop or add specific wavelength channels without affecting the through channels. Fixed OADMs can simplify the network and readily allow cost-effective DWDM migration from simple point-to-point topologies to fixed multi-point configurations. True dynamic OADM, in which reconfiguration is done in the optical domain without optical-electrical conversion, would allow dynamically reconfigurable, multi-point DWDM optical networks. This dynamically reconfigurable multi-point architecture is slated to be the next major phase in network evolution, with true OADM an enabling network element for this architecture.

On chip integration of optical switching and planar light circuits has the potential to greatly reduce the size and manufacturing costs of multi-component optical equipment such as Variable Optical Attenuators (VOAs). Current costs for Variable Optical Attenuators (VOAs) are significant, limiting their use to long-haul optical telecommunications networks. In order to extend their use into the metropolitan network the cost will need to be decreased by an order of magnitude without sacrificing performance.

One solution in particular to decreasing cost is through the integration of components, where the primary cost savings will be in packaging. A number of approaches are being pursued for optical integration using Planar Light Circuit (PLC) technologies. The majority of approaches use a silica-on-silicon platform with the VOA formed from the integration of silica Arrayed Waveguide Gratings (AWG's) for multiplexing and demultiplexing, with Thermo-Optic (TO) attenuators for performing the add/drop and pass of the demultiplexed signal. The use of a low-index contrast silica-on-silicon platform severely limits the yield of these components due to the requirement for uniform thick oxide films over large areas to form the waveguides. The use of TO attenuators limits the extensibility due to high-power requirements and thermal cross-talk.

A number of different materials and switching technologies are being explored for fabricating chip-scale photonic lightwave circuits such as AWG's for demultiplexers and multiplexers, Variable Optical Attenuators (VOA's) and Reconfigurable Optical Add-Drop Multiplexers (ROADMs). The main material platforms include silica wafers, silica-on-silicon substrates using both thin film deposition and wafer bonding techniques, polymer waveguides defined on silicon substrates, and silicon-on-insulator substrates. The main switching technologies include Mach-Zehnder interferometers based on either a thermo-optic or electro-optic effect, and MEMS mechanical waveguide switches and attenuators.

While silica waveguides have optical properties that are well matched to the optical properties of conventional single mode fibers, and thus couple well to them, they require thick cladding layers due to the low index of refraction contrast between the waveguide core and cladding materials, making them difficult to fabricate using planar processing techniques for fabrication and integration with other on-chip optical devices. The low index of refraction contrast, $\Delta n$, between core and cladding also requires large bending radii to limit optical loss during propagation through the photonic lightwave circuit, leading to large chip footprints and low die yields (<50%).

In addition, silica based waveguide attenuators are typically based on Mach-Zehnder interference using thermo-optic effects, that have a limited Extinction Ratio (ER) of around 25-30 dB, require significant power due to the low thermo-optic coefficient of silica, have problems with thermal cross-talk between the different optical channels and have a sinusoidal rather than a digital optical response.

What is needed is a Silicon-On-Insulator (SOI) platform for monolithically integrating optical, mechanical and electrical functions. The use of a silicon platform enables fabrication of components using the vast infrastructure and process development available for semiconductor IC manufacturing at silicon foundries. By fabricating the MEMS switches, attenuators and waveguides in the same material, single crystal silicon, there are no stress and strain issues as exist with heterogeneous materials sets such as silica-on-silicon. Fabrication in silicon also allows for integration with CMOS microelectronics for control and sensing capabilities, and for free-carrier plasma dispersion effects to enable signal leveling using integrated VOA's. The high index contrast of silicon (n=3.5) enables the ridge waveguide structures to make tight turns with minimum optical bending loss, decreasing overall chip size to centimeter dimensions.

Disclosed in embodiments herein is a micro-electro-mechanical variable optical attenuator comprising a fixed optical waveguide and a movable waveguide shuttle further comprising an optical waveguide which may be brought into substantial alignment with the fixed optical waveguide. The micro-electro-mechanical variable optical attenuator further comprises an actuator micro-incrementally misaligning the movable waveguide shuttle thereby correspondingly micro-incrementally misaligning the movable optical waveguide relative to the fixed optical waveguide. A latch is provided that will hold the movable optical waveguide as micro-incrementally misaligned, relative to the fixed optical waveguide, by the actuator, in a manner such that any optical signal passing through the fixed optical waveguide and movable waveguide is attenuated.

Also disclosed in embodiments herein is a micro-electro-mechanical optical switch and variable optical attenuator comprising a first fixed optical waveguide for selection and a second fixed optical waveguide for selection. Further provided is a movable waveguide shuttle further comprising an optical waveguide which may be brought into substantial alignment with either the first fixed optical waveguide or the second fixed optical waveguide as selected. An actuator is provided for micro-incrementally misaligning the movable waveguide shuttle thereby correspondingly micro-incrementally misaligning the movable optical waveguide relative to the selected first or second fixed optical waveguide; and a latch that will hold the movable optical waveguide as positionally micro-incrementally misaligned relative to the selected first or second fixed optical waveguide, by the actuator in a manner such that any optical signal passing through the fixed optical waveguide and movable waveguide is attenuated.

Further disclosed in embodiments herein is a micro-electro-mechanical system optical switch with integral variable optical attenuator comprising two or more fixed optical waveguides and a movable waveguide shuttle which may be brought into substantial alignment with any of the two or more fixed optical waveguides. The micro-electro-mechanical system optical switch with integral variable optical attenuator further comprises an actuator for switching the movable waveguide shuttle to a selected one of the two or more fixed optical waveguides and further capable of micro-incrementally misaligning the movable waveguide shuttle relative to the selected one of the two or more fixed optical waveguides, and a latch that will hold the movable waveguide shuttle as micro-incrementally misaligned by the actuator, relative to the selected one of the two or more fixed optical waveguides, in a manner such that any optical signal passing through is attenuated by some variably desired amount.

BRIEF DESCRIPTION OF THE DRAWINGS

The drawings are not necessarily to scale and are only for purposes of illustration.

FIG. 13 is a close-up of the latch teeth mechanism as provided in FIG. 12.

FIG. 14 is a further alternative stair-step latch tooth mechanism.

FIG. 18 depicts a gear tooth cam style actuator mechanism for micro-misalignment.

FIG. 19 depicts a gear tooth cam style actuator mechanism for micro-misalignment with step facets.

DETAILED DESCRIPTION

The teaching as provided herein below provides for an improved waveguide shuttle optical switch design which provides the function of switching and also performs the function of a variable optical attenuator (VOA). After the optical switching of a movable waveguide associated with the waveguide shuttle optical switch, a small degree of intentional misalignment of the movable waveguide will create different levels of optical attenuation. By finely controlling the misalignment of a selected switched position, the device can thereby provide the functions of both switching and attenuating. This exemplary integration of the switching function and the VOA function also reduce the optical loss which is otherwise unavoidable when the inevitable alterative of a separate switch and a separate VOA must necessarily be employed. This improved device can also be applied for correcting the difference in optical intensity created by the manufacturing tolerances inherent in the fabrication of an array waveguide grating (AWG).

An optical micro-electro-mechanical system (MEMS) combination waveguide shuttle optical switch and attenuator is herein disclosed below. In one embodiment the optical MEMS attenuator is used as an M×N optical signal switching system. The optical MEMS attenuator comprises a plurality of optical waveguides formed on a waveguide shuttle platform for switching optical states wherein the state of the optical attenuator is changed by a system of drive and latch actuators. The optical MEMS device utilizes a latching mechanism in association with a thermal drive actuator for aligning the waveguide shuttle platform. MEMS waveguide shuttle provides a parallel and symmetric movement of waveguides for optical switching. The advantages of the design herein over an approach employing a cantilever waveguide, is the lower power consumption from lowering the spring constant, and the larger travel distance that may be readily realized. As will be evident to one skilled in the art, the optical MEMS device may be integrated with other optical components to form planar light circuits (PLCs). When attenuators and PLCs are integrated together on a silicon chip, compact higher functionality devices, such as Reconfigurable Optical Add-Drop Multiplexers (ROADMs), can be fabricated.

Figure 1:
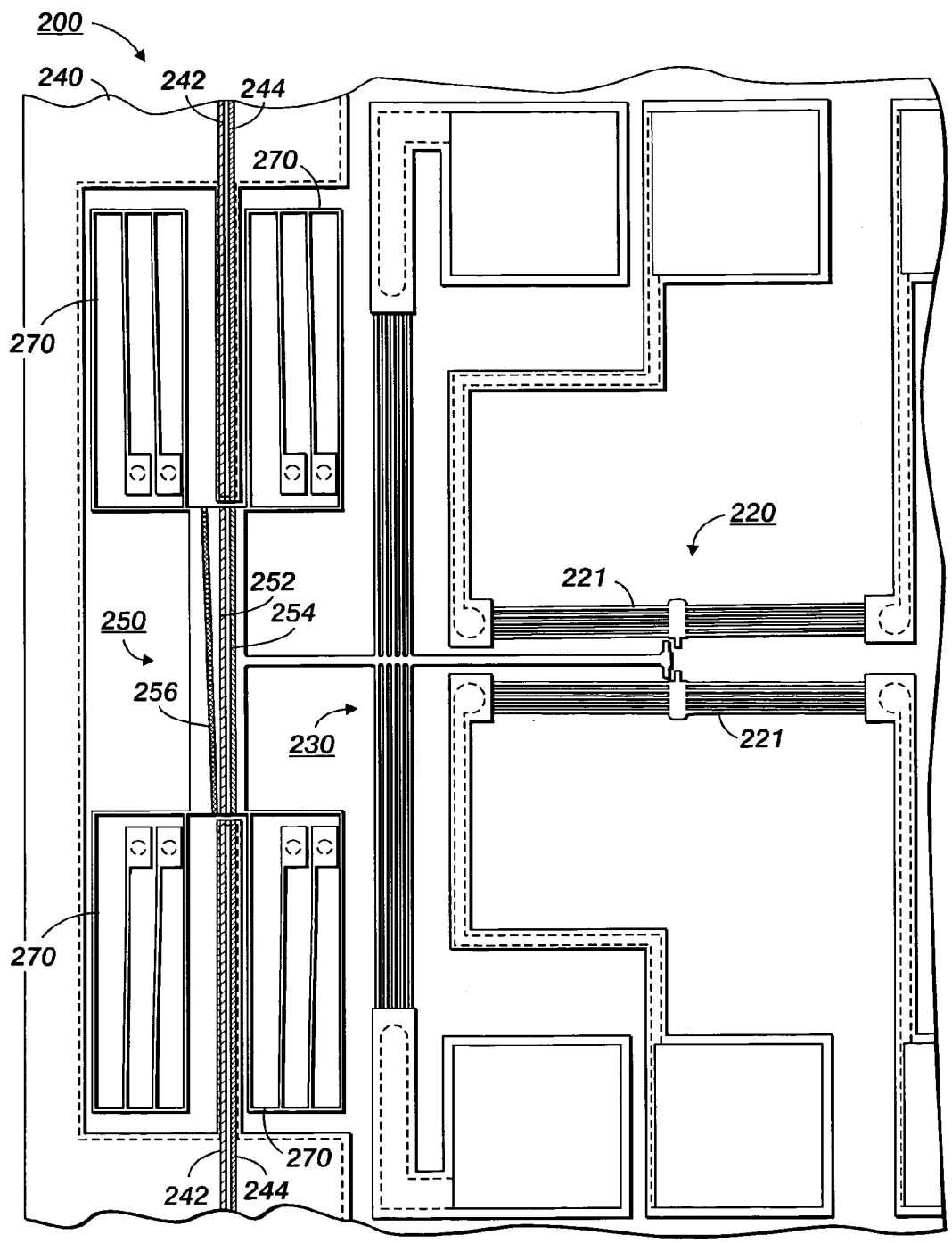
FIG. 1 is a cut away top plane view of an optical MEMS (Micro-Electro-Mechanical System) switch.

Referring now to FIG. 1 there is shown a top plane view of an optical MEMS (Micro-Electro-Mechanical System) switch 200 in accordance with the present invention. All components shown may be fabricated in a single-crystal silicon (SCS) layer 240 using a self-aligned process. The optical MEMS switch utilizes a latching mechanism 220 in association with a thermal drive actuator 230 for aligning a waveguide shuttle 250. The components fabricated in the device layer of an SOI wafer may be released by sacrificial etching of the buried oxide layer. In use the optical MEMS switch 200 may be integrated with other optical components to form planar light circuits (PLCs). When switches and PLCs are integrated together on a silicon chip, compact higher functionality devices, such as Reconfigurable Optical Add-Drop Multiplexers (ROADMs), may be fabricated.

Figure 3:
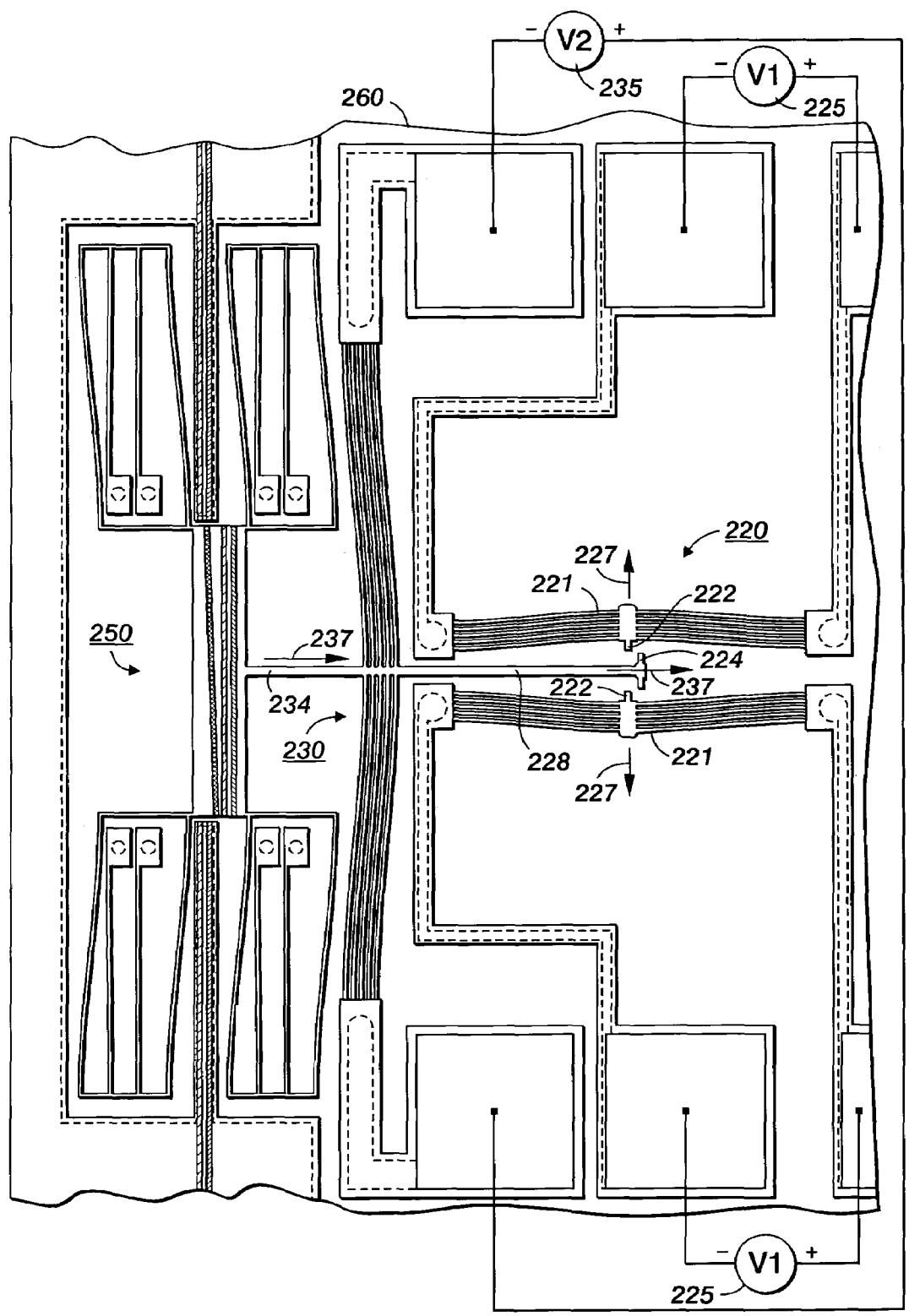
FIG. 3 is a top plane view showing the optical switch actuated by the thermal drive actuator to an overshoot position when the latch is actuated in the open position.

As shown in FIGS. 1 and 3, the optical switch 200 comprises one or more thermal drive actuators 230 having associated during fabrication one or more thermal latch actuators 221, each thermal latch actuator 221 defining translating latch teeth 222. The movable waveguide shuttle platform 250 defines a plurality of optical waveguides 252, 254 and 256 which may be connected with suspension elements shown as one or more folded springs 270. A tether 234 connects the one or more thermal drive actuators 230 to the movable waveguide shuttle platform 250. A linkage 228 connects one or more linkage teeth 224 to the thermal drive actuator 230. The latch teeth 222 are located to determine one or more latched state positions wherein electrical stimuli is timed to actuate the thermal drive 230 and thermal latch actuators 221 so as to switch between equilibrium and latched states. As shown in FIG. 3 the one or more linkage teeth 224 move in an orthogonal direction with respect to the translating latch teeth 222.

Referring once again to FIG. 1, the optical switch 200 is shown in its initial cross-state position. The thermal drive actuator(s) 230 are used to move the waveguide shuttle 250 to its non-equilibrium position (pass-state), while the thermal latch mechanism 220 can maintain the system in the pass-state. The latching thermal actuators 221 are fabricated to provide sufficient force to hold the waveguide shuttle platform 250 in its non-equilibrium (cross-state) position. In operation the. optical switch 200 can be unlatched by passing current through the latch actuators 221, thereby opening the latch so the waveguide shuttle platform 250 returns to its equilibrium position (cross-state) under the restoring force provided by the four-folded shuttle springs 270. The thermal drive and latch actuators 230 and 221 are defined during fabrication in the SCS layer 240 and are self-aligned. Similarly, the shuttle waveguides 252, 254 and 256 and stationary waveguides 242, 244 are also defined in the SCS layer 240 and are self aligned. Since the latching mechanism 220, waveguide shuttle platform 250 and waveguides are defined in a self-aligned process during manufacturing, the alignment between the shuttle waveguides 252, 254 and the stationary waveguides 242 and 244 will be near perfect in the x-y plane. Additionally, the optical switch 200 needs to be sufficiently stiff in the z direction, or carefully designed to avoid forces in the z direction, to avoid misalignment in the z direction. Sufficient displacement, restoring and suspension forces can be attained through the design of the thermal drive actuator 230 and the folded springs 270.

The folded springs 270 are used for restoring and suspending the waveguide shuttle platform 250. The folded springs 270 may be designed using the equation for the spring constant $K=(Eab^3)/(8L^3)$ where "a" is the thick dimension of the beams that make up the spring and "b" is the thin dimension of the beam that make up the spring. "L" is the length of the beam that makes up the spring, and "E" is Young's modulus (165 GPa for polysilicon, 190 GPa for single crystal silicon). The length L of the beams and the width of the beams can be adjusted to make the springs sufficiently flexible for the thermal drive actuator(s) 230 to deflect them between the two functional positions ($\Delta x \sim 12$ μm).

Referring now to FIGS. 1 through 4, the waveguide shuttle platform 250 has moving waveguides 252, 254 and 256 respectively, wherein the waveguide shuttle platform 250 is moved between two positions. The first or equilibrium position (cross-state) has stationary input and output waveguides 242 and 244 aligned with shuttle waveguides 252 and 254. In the second or non-equilibrium position (pass-state) the movable shuttle waveguide 256 connects the stationary input waveguide 244 to the stationary output waveguide 242. The folded springs 270 provide the restoring force to return the switch channel to the cross-state once the latch 220 has been released. Therefore, the movable shuttle platform 250 is pulled or pushed by the one or more thermal drive actuators 230. The one or more drive actuators 230 may also act as suspension elements for the movable shuttle platform 250. The movable shuttle platform 250 can be deflected bi-directionally and has mechanical features to increase or reduce the stiffness of the movable shuttle platform 250 and associated suspension.

Switches can often be described as "latching" or "non-latching". A latching switch reliably preserves the switch state even if the power is removed or lost. A non-latching switch may revert to an unknown position when the power is lost, for example when the current provided to a thermal actuator or electromagnetic solenoid is lost.

Figure 2:
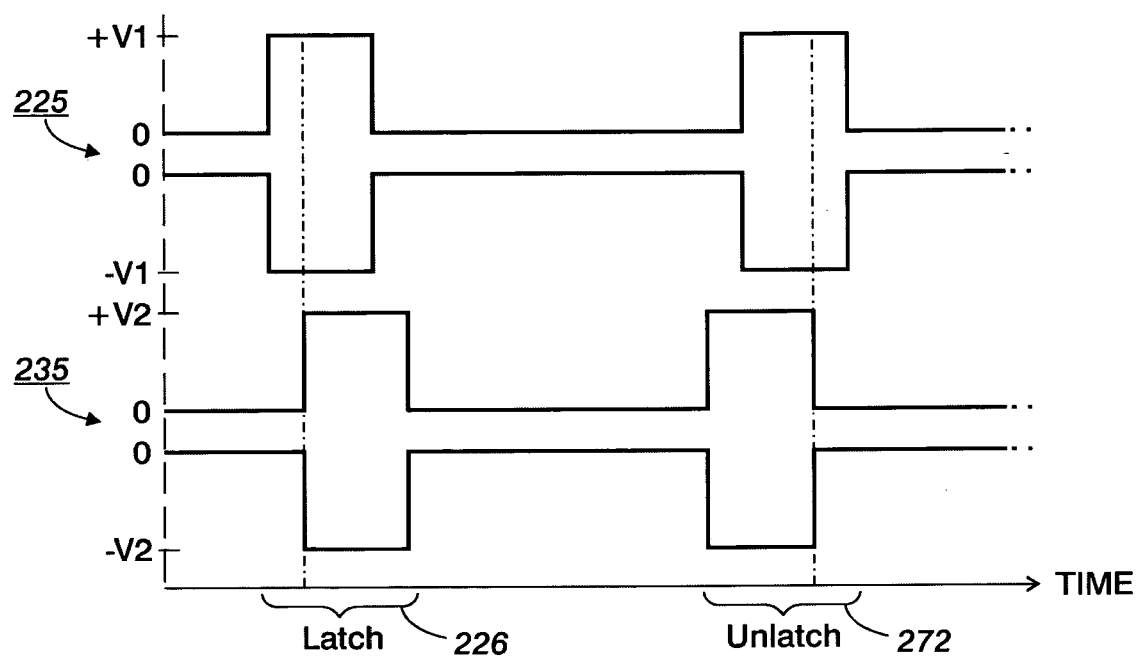
FIG. 2 is a graphical view of a timing diagram for controlling a thermal latch actuator, thermal drive actuator and waveguide shuttle with folded springs.

Referring now to FIGS. 2 and 3 the timing sequence of the signals used to actuate the thermal drive 230 and thermal latch 220 mechanisms and corresponding movement are shown, where the voltages are labeled assuming the potential of the handle wafer or base substrate 260 is zero. The first portion 226 of the timing diagram shows the latching sequence. The first step in the latching sequence is to apply voltages 225 having equal but opposite polarities, a voltage +V1 to one end of each thermal latch actuator 221, and a voltage −V1 to the other end of each latch actuator 221. The voltages 225 on the thermal latch actuators 221 induce ohmic heating in the actuator beams, causing thermal expansion and the subsequent opening 227 of the latch 220 as shown in FIG. 3. While the latch actuator voltage 225 is still applied, the drive actuator 230 is stimulated a second set of voltages 235 having equal but opposite polarities, a voltage +V2 at one end and a voltage −V2 at the other end.

Figure 4:
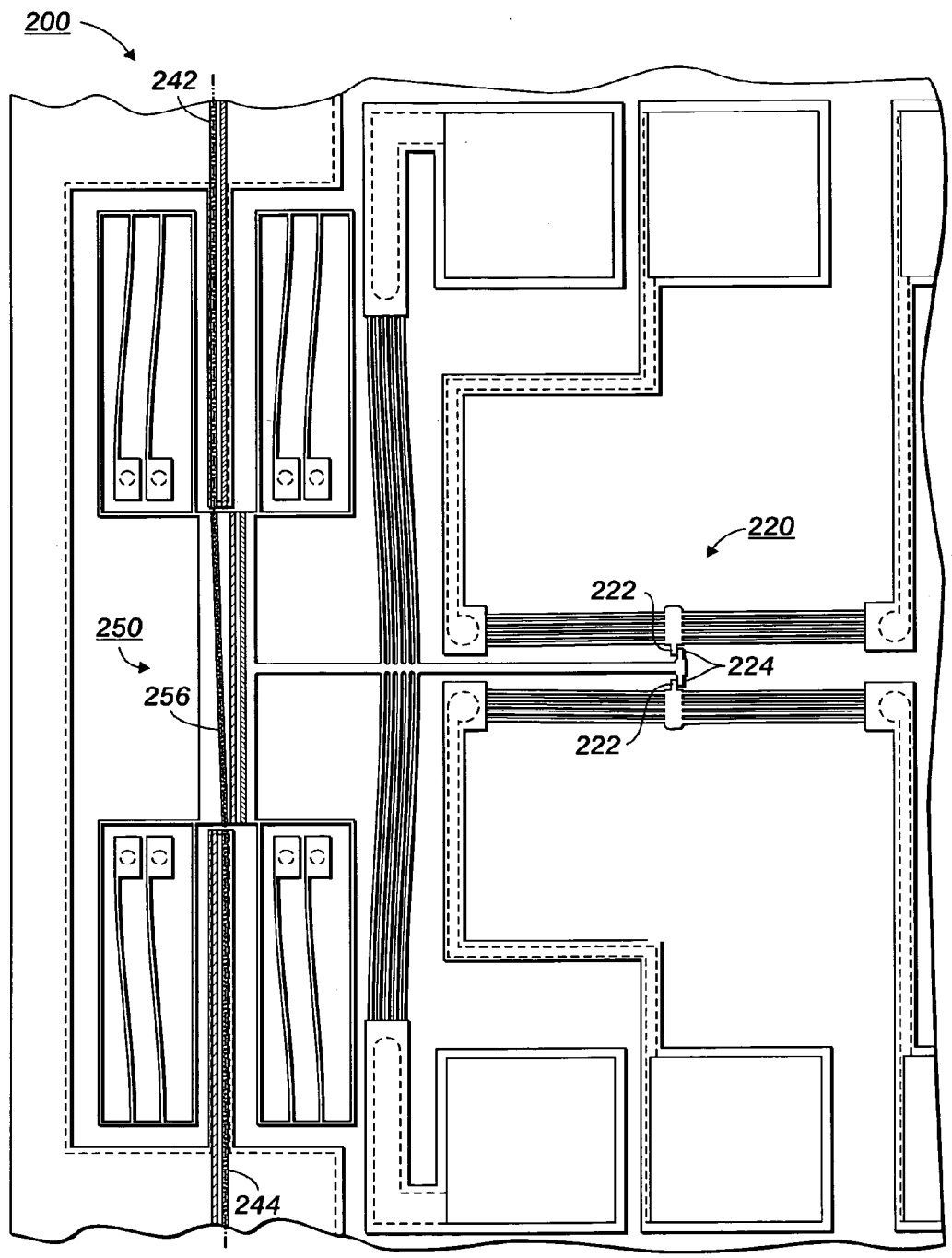
FIG. 4 is a top plane view showing the latching mechanism in the latched position.

FIG. 3 shows how the resulting thermal expansion of the thermal drive actuator 230 sufficient to move the waveguide shuttle 250 and linkage having linkage teeth 224. The drive actuator 230 is moved far enough to the right 237 for the linkage teeth 224 to be well to the right side of a pair of latch teeth 222 supported by thermal actuators 221. Next the thermal latch actuator voltages return to zero, and the latch closes. To finish the latching sequence, the drive actuator voltages return to zero. As the drive actuator 230 cools, the linkage teeth 224 are drawn in tension against the latch teeth 222 which holds the shuttle 250 in the desired latched position as shown in FIG. 4. The shuttle waveguide 256 now connects the stationary waveguide 244 to stationary waveguide 242. To return the optical switch to its original state, the same sequence of voltages are applied in the reverse timing, as shown in the unlatch portion 272 of FIG. 2.

It should be noted that, although the timing diagram shown in FIG. 2 depicts square wave voltage pulses, this depiction is meant to be illustrative only of the basic timing, and does not preclude the use of other waveforms. Furthermore, the voltages applied to the thermal actuators need not be symmetric about zero. However, the use of equal but opposite polarity pulses, as described above, results in a constant zero voltage at the center of each actuator throughout the latch and unlatch cycle, which reduces electrostatic forces between the thermal actuators and the handle wafer 260.

Figure 5:
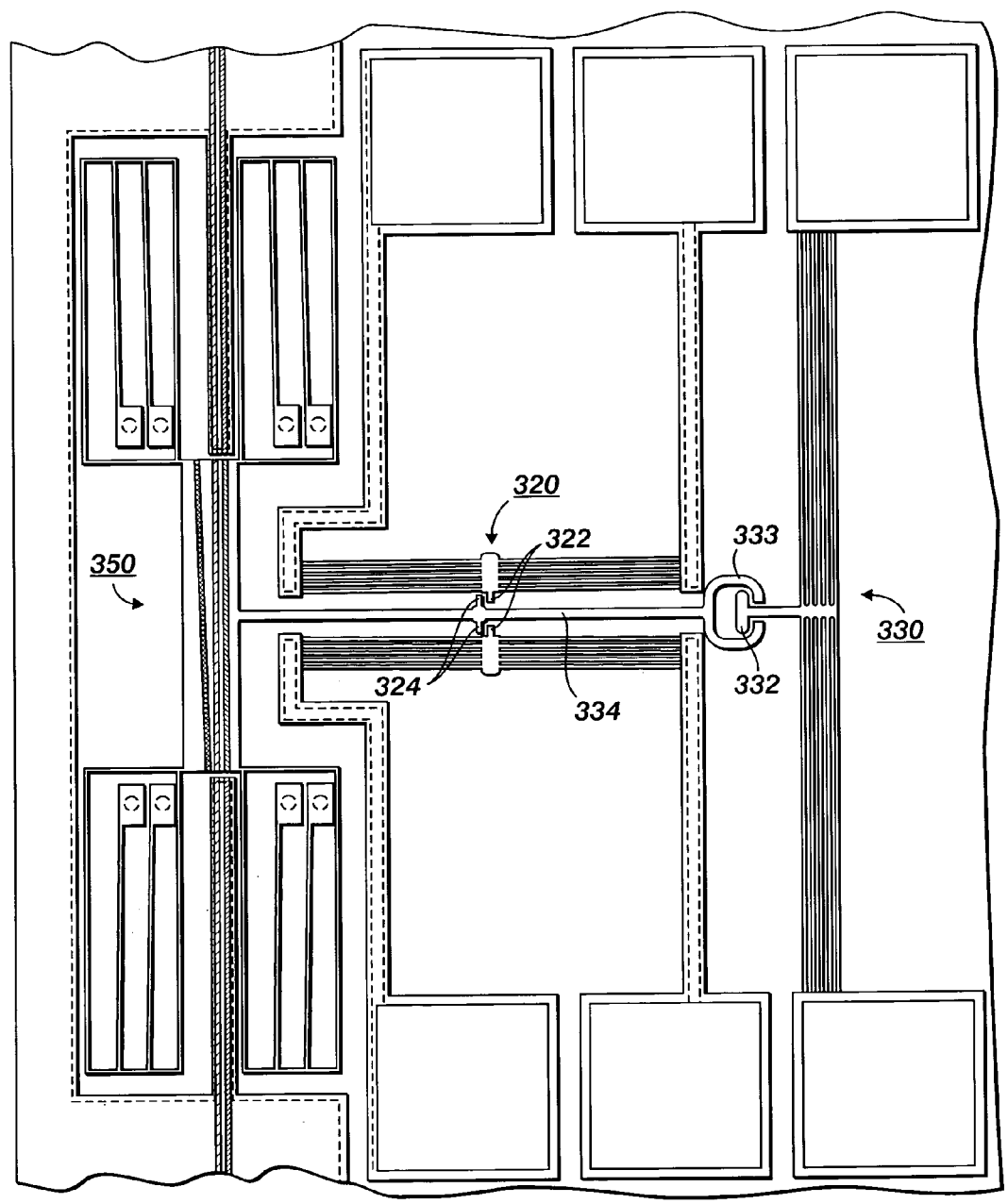
FIG. 5 is a cut away top plane view of an optical MEMS switch with an in-plane hitch and latch teeth embodiment.
Figure 6:
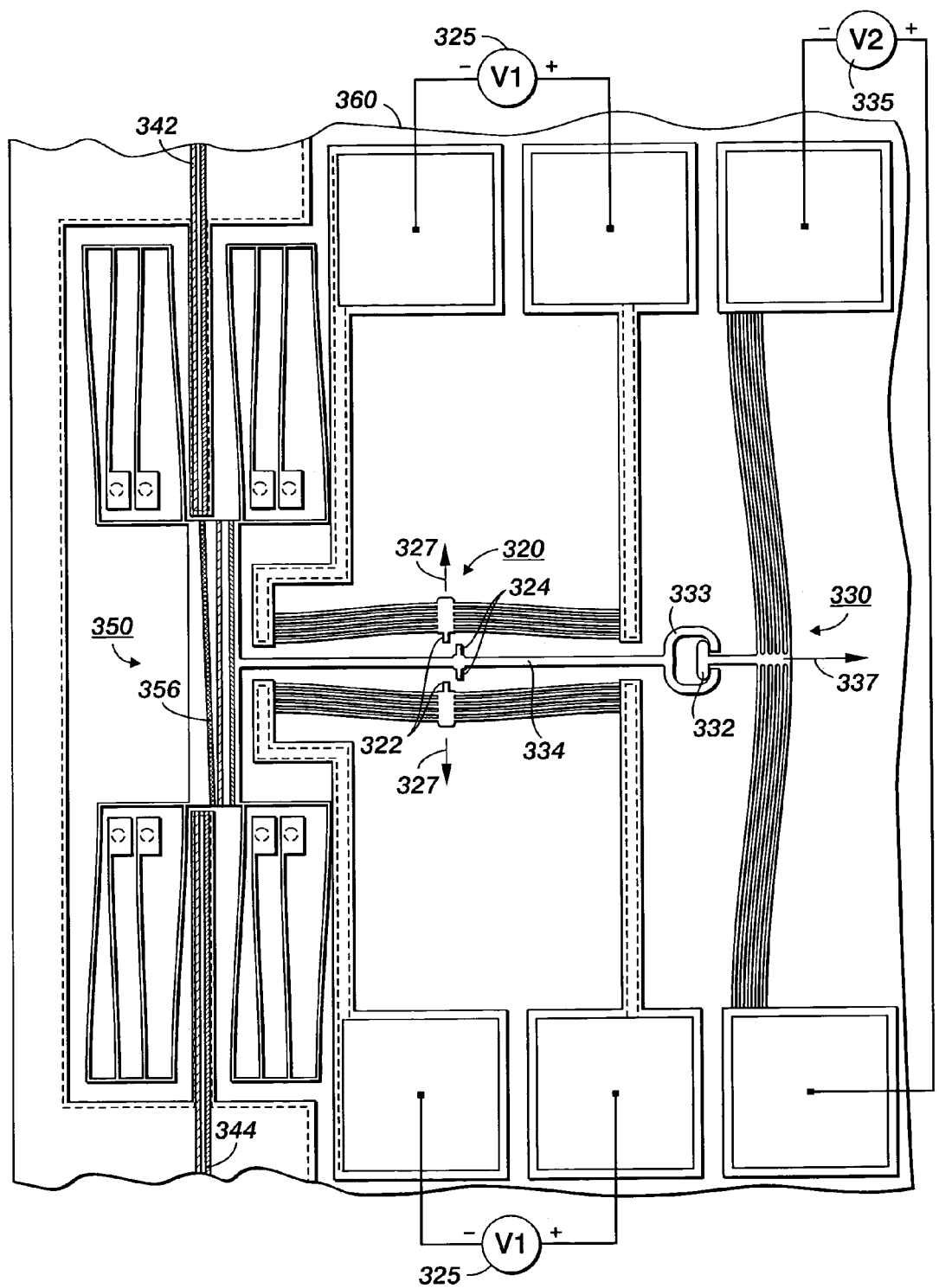
FIG. 6 is a cut away top plane view of an optical MEMS switch illustrating the in-plane hitch that is engaged while the drive switch is actuated by the thermal drive actuator to an overshoot position with the latch actuated in the open position.
Figure 7:
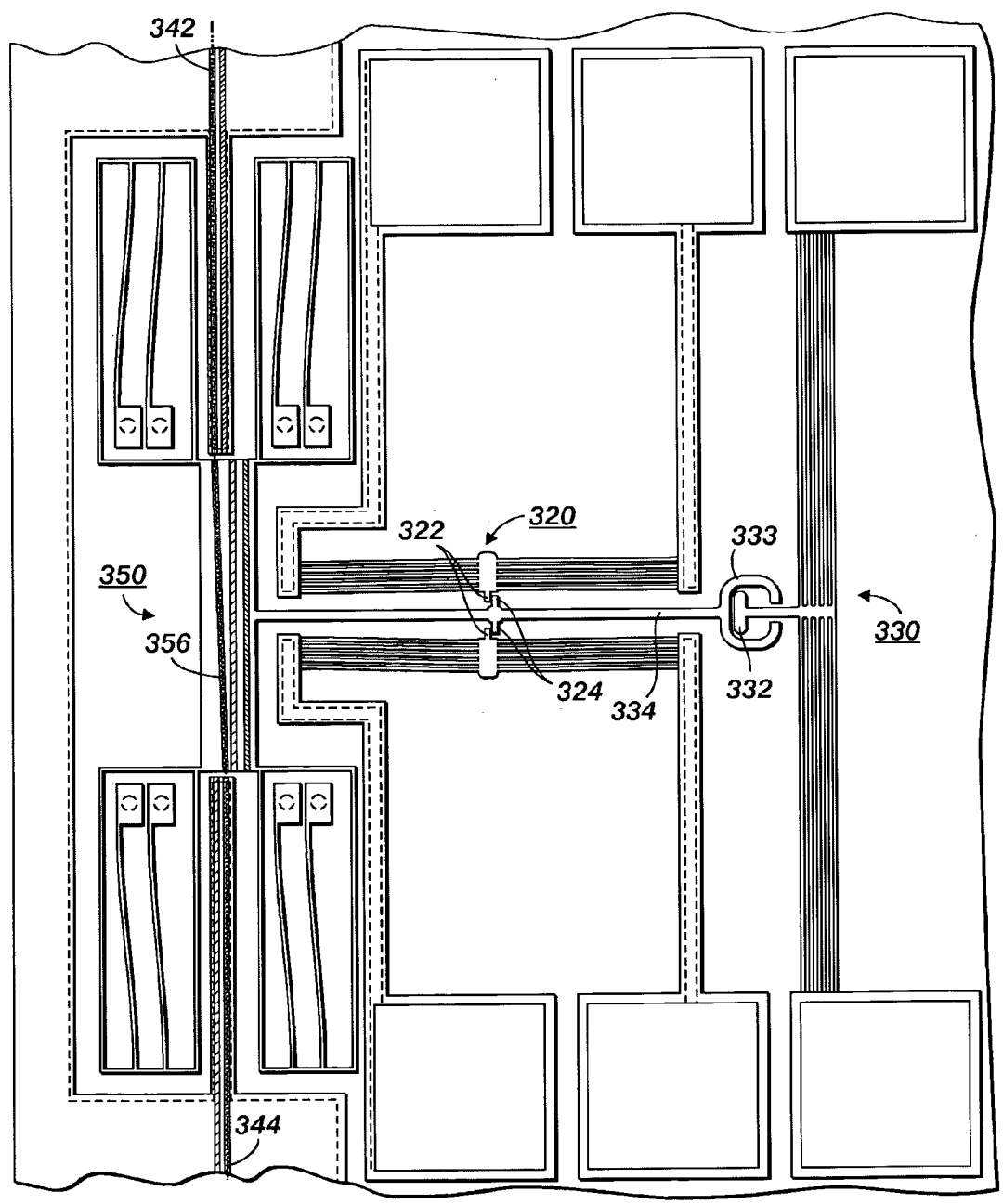
FIG. 7 is a cut away top plane view of an optical MEMS switch illustrating the optical switch in its latched state with the thermal drive actuator returned to its equilibrium state.

In another embodiment shown in FIGS. 5 through 7, an additional strain relief element is included to reduce stress in the latched state. A "hitch" 332 and 333, shown on the right side of FIG. 5, transfers the pulling force to displace the shuttle 350 during drive actuation. After latching, the hitch 330 allows the drive actuator 320 to return to its initial state without compressing the linkage 334 between the drive and the latch, thereby decreasing the force load at the engaged teeth 322 and 324.

Referring to FIGS. 5 through 7, there is shown the actuator 330 and in-plane hitch 332 and 333 respectively. The actuation of this system is analogous to the system embodiment depicted in FIG. 1. Referring once again to FIG. 2, the timing sequence of the signals is shown used to actuate the drive and latch mechanisms, where the voltages are labeled assuming the potential of the handle wafer or base substrate 360 is zero. Once again the first step in the latching sequence is to apply a pair of voltages 325, +V1 to one end of each latch actuator, and a voltage −V1 to the other end of each latch actuator. The voltages on the latch actuators induce ohmic heating in the actuator beams, causing thermal expansion and the subsequent opening of the latch as shown in FIG. 6. While the latch actuator voltage is still applied, the drive actuator 330 is stimulated with a pair of voltages 335, +V2 at one end and a voltage −V2 at the other end.

FIG. 6 shows how the resulting thermal expansion 337 of the drive actuator 330 is sufficient to move the waveguide shuttle 350 and linkage 334 far enough to the right for the linkage teeth 324 to be well to the right side of the latch teeth 322. Next the latch actuator voltages return to zero, and the latch closes. To finish the latching sequence, the drive actuator voltages return to zero. As the drive actuator cools, the linkage teeth 324 are drawn in tension against the latch teeth 322 which holds the switch in the desired latched position as shown in FIG. 7. The shuttle waveguide 356 now connects the stationary waveguide 344 with stationary waveguide 342. To return the switch to its original state, the same sequence of voltages are applied in the reverse timing, as shown in the unlatch portion of FIG. 2.

The attenuator waveguides are made together on a single crystal silicon wafer using widely available semiconductor processing equipment. Such on-chip integration avoids the complex alignment issues associated with manually connecting different and larger components with optical fibers, and avoids the cost and space associated with manufacturing, assembling and packaging the separate components of optical switches. On-chip integration with other components can drive down the cost of manufacturing attenuators and the installation of these complicated devices by a factor of ten or more.

Figure 8:
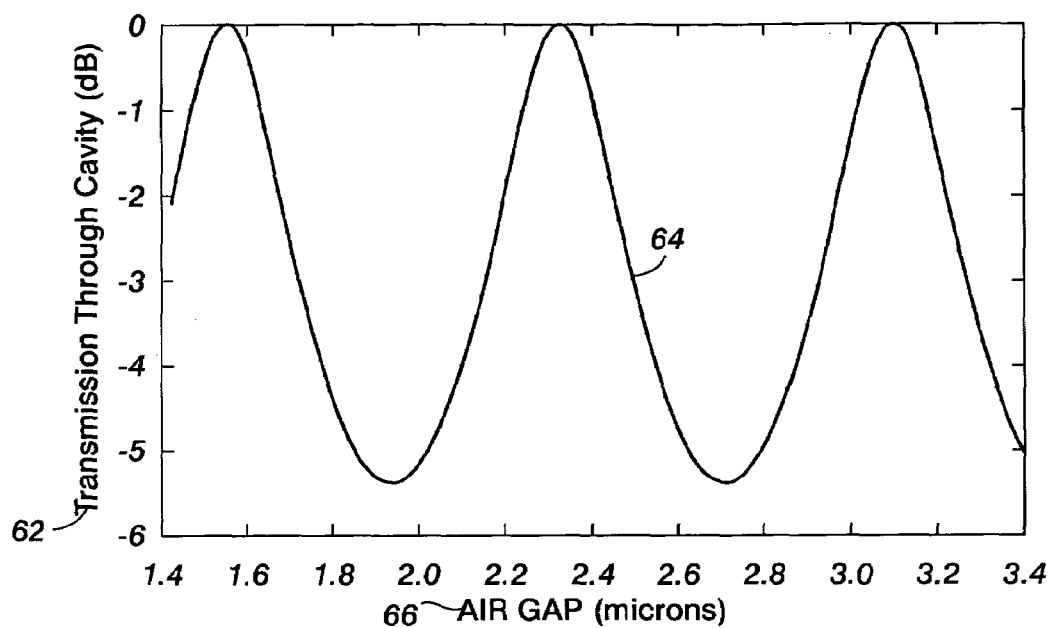
FIG. 8 is a graphical illustration of the transmission loss through the waveguide.

An embodiment for a MEMS device as provided herein may comprise (1) M×N multiple waveguide optical attenuator with improved optical loss through the gap; (2) variable optical attenuator; (3) integrated optical switch that also functions as a variable optical attenuator. M×N multiple waveguide optical attenuator with improved optical loss through gap: The optical loss from the gap can be minimized by properly selecting the gap distance so that the Fabry-Perot resonant condition is satisfied. For a gap value, d, between two identical large planes with reflectivity R, the transmission coefficient is given by:

$$T = \left[1 + \frac{4R\sin^2 kd}{(1-R)^2}\right]^{-1}$$

where k is the wave vector of the light. The Fabry-Perot resonance condition is thus:

$$d = m\lambda/2$$

where m=1, 2 . . . , and λ is the wavelength of the light. FIG. 8 shows that the optimal gap value d are 0.775 μm, 1.55 μm, 2.325 μm, 3.1 μm, 3.875 μm, 4.65 μm etc for λ=1.55 μm. The gap distance of 2.325 μum has less loss by as much as 5 dB compared to the gap distance of 1.9 μm or 2.7 μm.

Figure 9A:
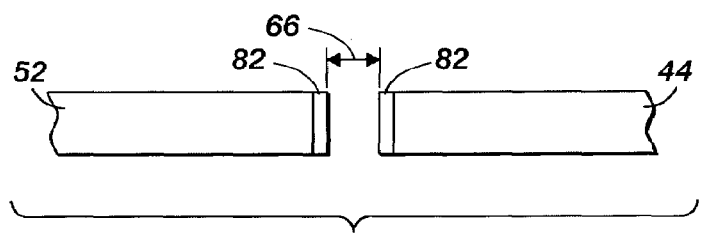
FIG. 9A is one embodiment illustrating an antireflection coating on a gap facet.
Figure 9B:
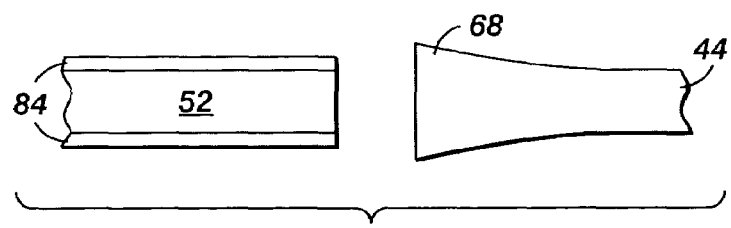
FIG. 9B is another embodiment illustrating an antireflection coating on a gap facet.

Other methods such as applying antireflection (AR) coating 82 on the gap facet can also reduce the transmission loss through the gap (FIG. 9A). Applying silicon oxide or silicon nitride coating 84 along the sidewall of the waveguide can also reduce the overall optical loss (FIG. 9B). Such techniques are exemplary for increasing the effective dynamic range of useful attenuation that may be realized in a combined Integrated optical switch also functioning as a variable optical attenuator as further described below.

Figure 10A:
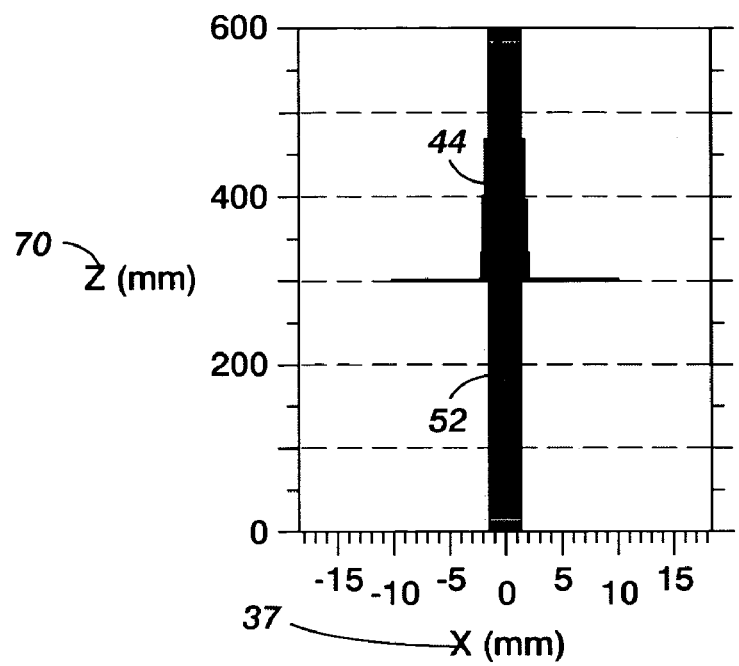
FIG. 10A is a graphical illustration representing a first distance misalignment of the waveguides.
Figure 10B:
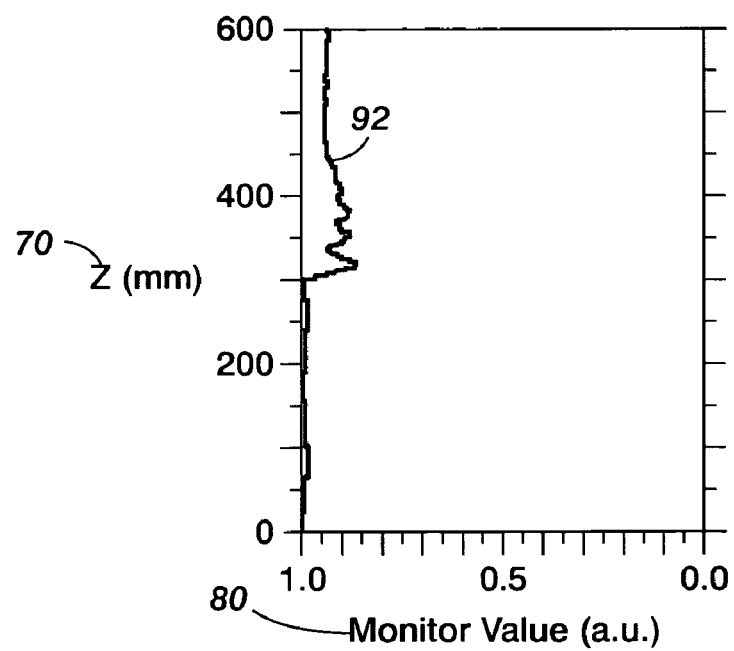
FIG. 10B is a graphical illustration representing the normalized optical attenuation values for the misalignment distance illustrated in FIG. 10A.
Figure 11A:
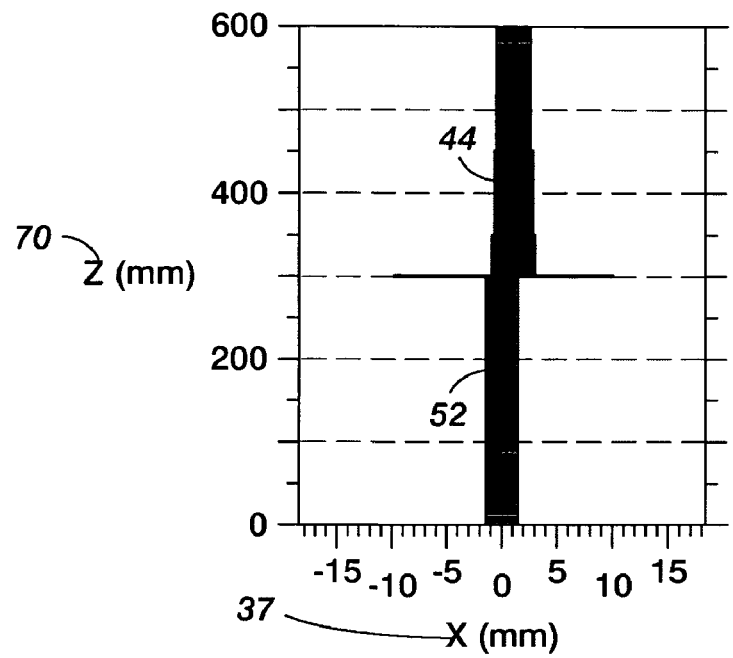
FIG. 11A is a graphical illustration representing a second distance misalignment of the waveguides.
Figure 11B:
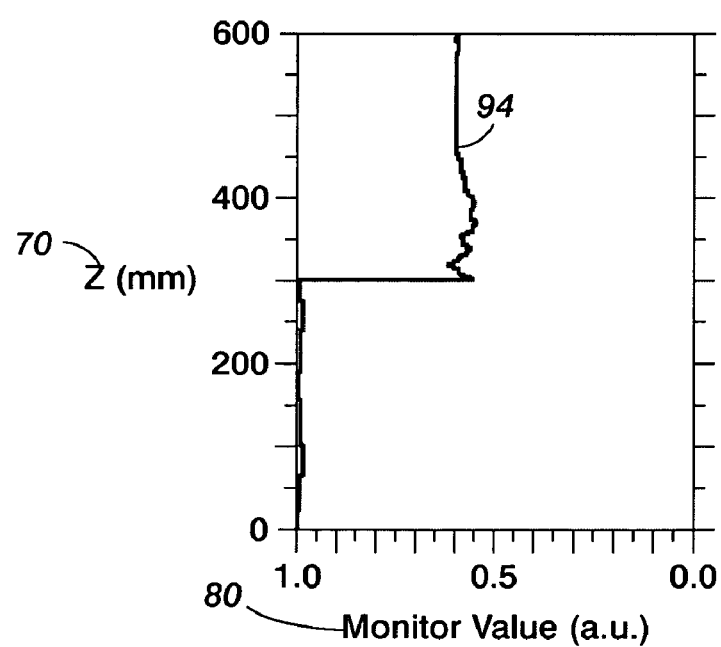
FIG. 11B is a graphical illustration representing the normalized optical attenuation values for the misalignment distance illustrated in FIG. 11A.

The simulation of light propagation through the gap between the fixed waveguide and the movable waveguide is shown in FIGS. 10 and 11. The waveguide width is 3 µm and the air gap is 2 µm in this embodiment. FIGS. 10A & 10B graphically show the perfectly aligned cantilever beam waveguide geometries and resultant attenuation 92 respectively. FIGS. 11A & 11B depict the waveguide geometries and resultant attenuation 94 respectively for a purposely misaligned cantilever beam waveguide as misaligned by 1 µm. The optical loss 92 for the perfectly aligned waveguides is due to the air gap between the "in" waveguide 52 on the cantilever and the "Out" waveguides 44. Taper at the light-receiving waveguide 44 (width of 4 µm tapered to 3 µm over a distance of 200 µm in this study) is added for better optical coupling. The results clearly show that fine-tuning the misalignment could achieve the attenuation of the light intensity to the desired level.

Figure 12:
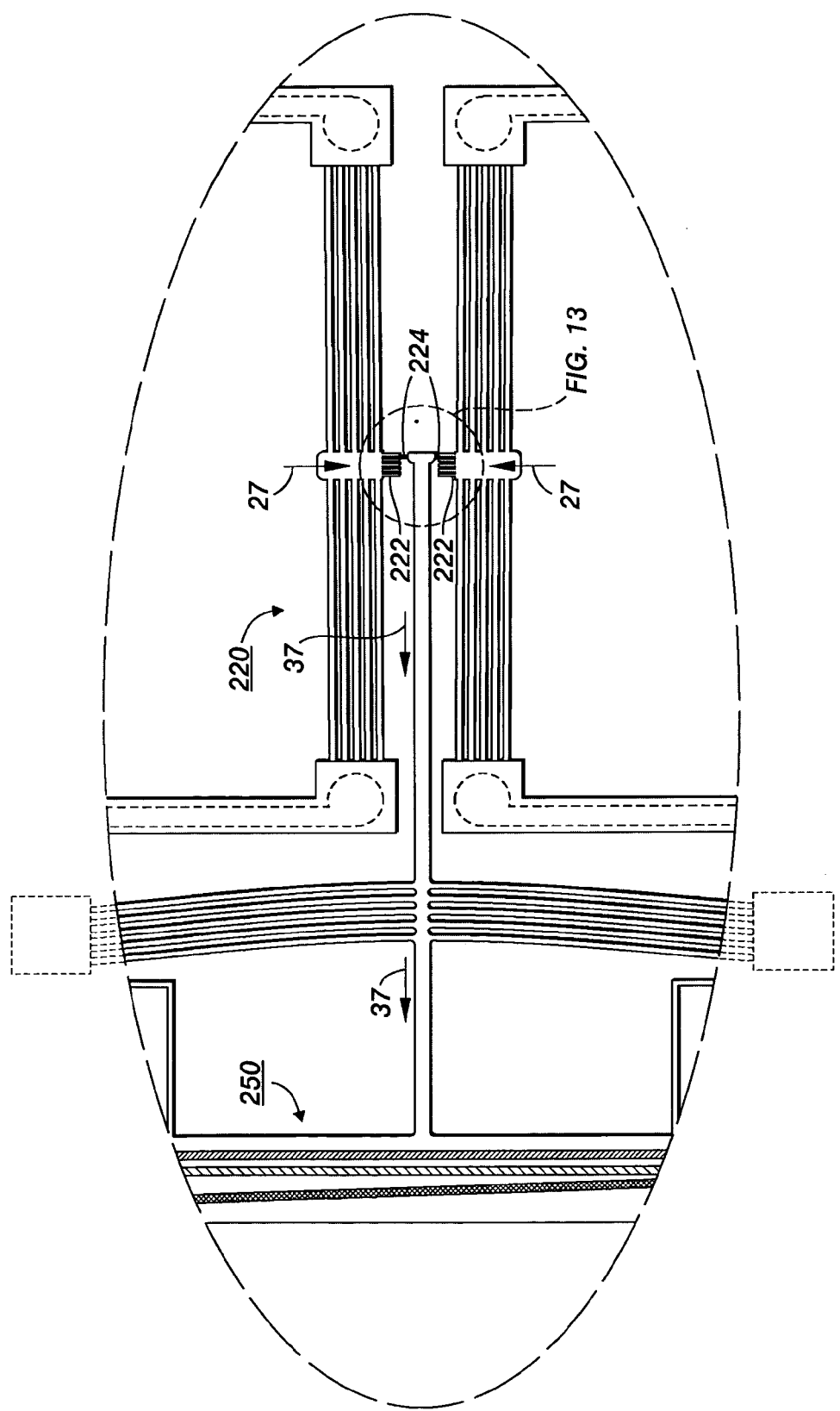
FIG. 12 is a top plane view showing an alternative latching mechanism in the latched position.

FIG. 12 provides depiction of one embodiment for an Integrated optical switch functioning as a variable optical attenuator. Much here is as described for FIGS. 3 and 4 above. However, here the linkage teeth 224 are provided with a plethora of latching teeth 222 with which they may be engaged. FIG. 13 provides a blow-up of the area of FIG. 12 depicting in an alternative embodiment, another differentiation here from the structure otherwise the same as that provided in FIGS. 3 and 4. The saw-tooth linkage teeth 224 are smaller here so as to best mate with the similarly saw toothed latching teeth 222 so as to allow small micro-incremental displacement of linkage 228. By providing this small micro-incremental displacement of linkage 228 the movable optical waveguide 254 may be correspondingly micro-incrementally misaligned from the fixed stationary optical waveguide 244. It is these small micro-incrementally misalignments from fixed stationary optical waveguide 244 (relative the fully aligned position) which will provide correspondingly varying amounts of optical attenuation. By the term micro-incrementally misaligned, here, it is meant that the amount of misalignment is but a fractional part of the total waveguide width.

As will be evident to those skilled in the art, and in alternative to the depiction provided in FIGS. 12 and 13, the above methodology and arrangement may be applied with but a single fixed stationary optical waveguide 244 and a single movable optical waveguide 254, so that only the attenuation function is provided, and is thus absent the above described switching functionality.

The waveguide shuttle 250 may be actuated by MEMS actuators such as, but not limited to, heat actuators, electrostatic actuators, electromagnetic actuators, and piezoelectric actuators. Results of the waveguide shuttle 250 by using a heat actuator shows that the tip of waveguide 52 displaces 15.3 µm as a V-shape actuator is heated to 600° C. In some embodiments, this distance (15.3 µm) would be the total traveling distance as an optical switch. For useful function as a variable optical attenuator, the waveguide shuttle only needs to move 2 µm or less. Therefore, as 2 µm of misalignment can achieve the desired optical attenuation, the waveguide 52 and waveguide shuttle 250 need only travel 13.3 µm to provide the function both a switch and a VOA together.

Various servo type approaches may be taken to effectuate this single optical gap and waveguide shuttle 250 VOA. An analog approach may provide a static voltage level representative of a desired attenuation level. A down stream sensor would then provide a voltage level as indication of attenuation. A voltage comparator upon comparison of these two levels would then provide a resultant closed loop control signal indicative of any need to readjust the micro-misalignment of the moveable optical waveguide. Those skilled in the art will understand that this may just as easily be performed digitally under either hardwired or software control. The choice will typically reside in the system environment and chip hardware environment in which the VOA is employed.

FIG. 14 depicts an alternative embodiment for linkage teeth 224 and latching teeth 222 where a stair-step arrangement is provided on their respective mating faces. As thermal latch actuator 221 and thermal drive actuator 230 interoperate small micro-incremental displacements of linkage 228 may accordingly be latched in place. Additional linkage teeth 224 identically provided with the stair-step faces will be provided along linkage 228 corresponding for each stationary optical waveguide 242, 244, etc. for which switching coupled with attenuation is desired. If attenuation is not needed then a single plain rectangular tooth devoid of the stair-step mating faces need only be substituted. It should be noted that one specific latched position between the linkage teeth 224 and the latching teeth 222 is for straight alignment of waveguides 244 and 252. At this position there is no optical attenuation other than normal gap loss.

Figure 15:
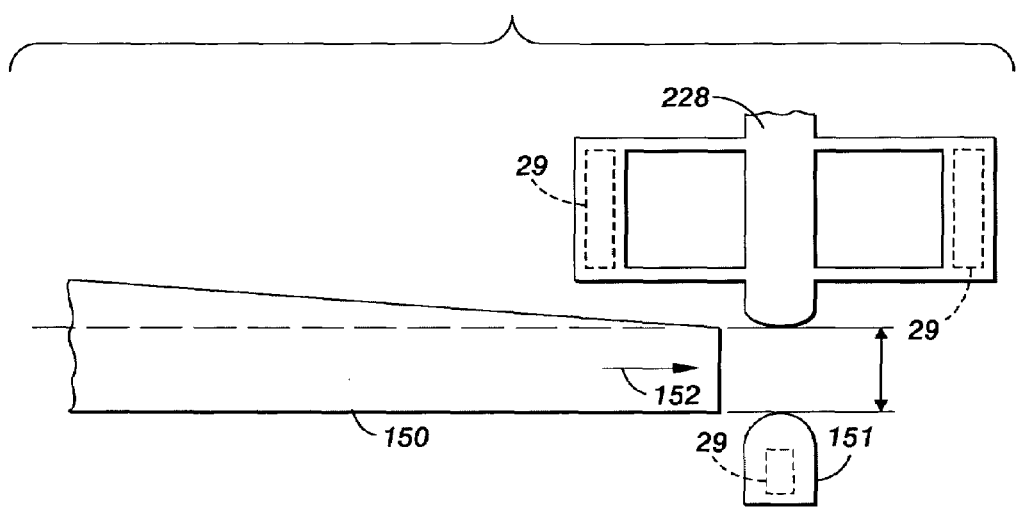
FIG. 15 depicts a wedge style actuator mechanism for micro-misalignment.
Figure 16:
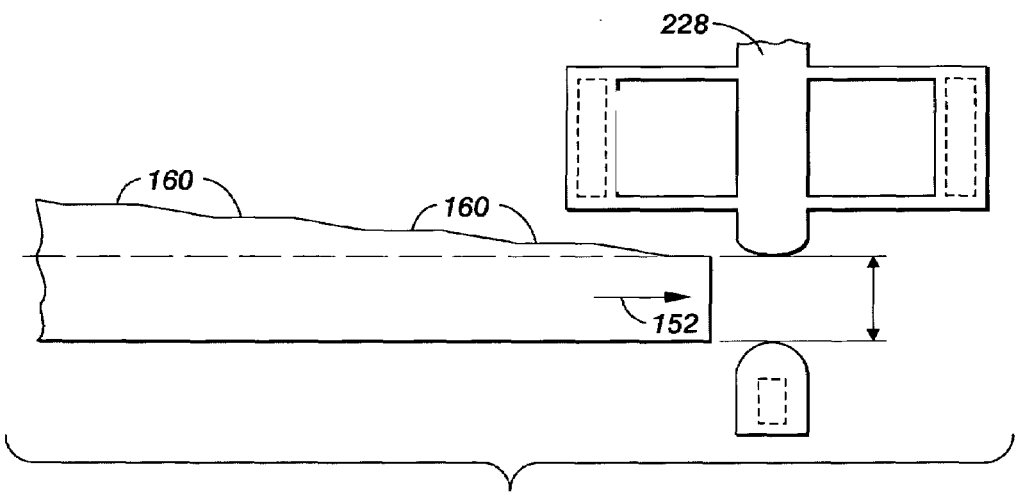
FIG. 16 depicts a stepped variant of the wedge style actuator mechanism for micro-misalignment in FIG. 15.

FIG. 15 provides yet another alternative embodiment for driving linkage 228 micro-incrementally. Wedge block 150 is driven by a thermal actuator between the tip of linkage 228 and a fixed pin 151 in direction 152. FIG. 16 provides an alternative to the infinitely variable embodiment of FIG. 15 by providing facets 160 which will give distinct incremental values of misalignment. The linkage 228 has anchors 29 to reduce the torque of the linkage 228 and to ensure the moving direction of the linkage 228 is perpendicular to the direction 152.

Figure 17:
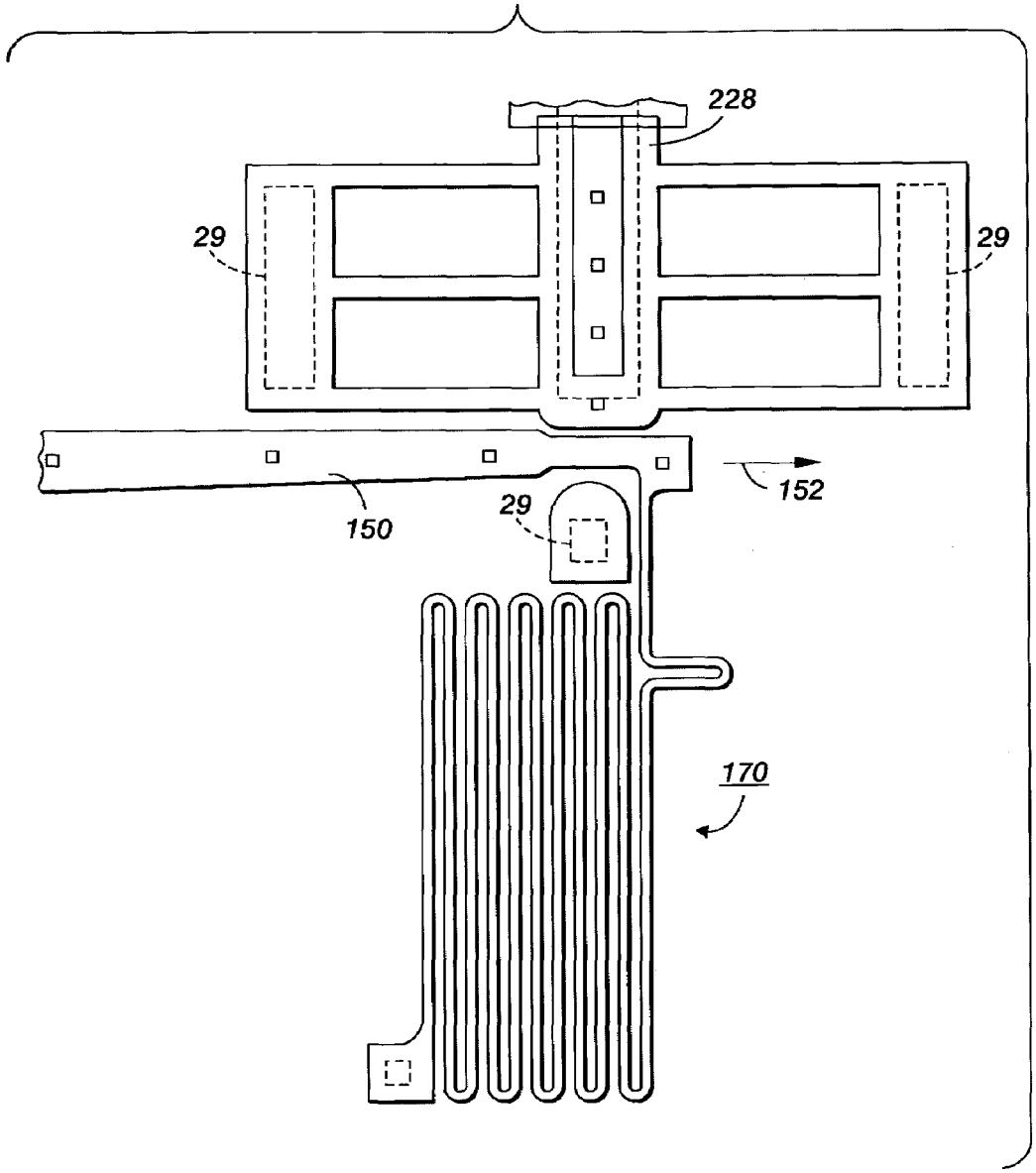
FIG. 17 is a more complete view of the wedge style actuator mechanism of FIG. 15 further employing a spring return.

FIG. 17 schematically depicts the arrangement of FIG. 15 as provided with a return spring 170 so as to counteract the force of a thermal actuator pushing the wedge block 150 in direction 152.

In FIG. 18 there is depicted yet a further alternative embodiment for micro-incremental misalignment. A gear toothed cam 180 is driven by a mated toothed drive bar 181 affixed to a thermal actuator and directionally driven as noted by arrow 182. To make the linkage 228 move incrementally, the cam 180 is anchored off the center where the radius R1 is the same as the radius R2, but the radius R3 is different than the radius R4 and the radius R1. FIG. 19 provides an alternative to the continuously variable embodiment of FIG. 18 by providing facets 190 which will give distinct discretely variable incremental values of misalignment.

Figure 20:
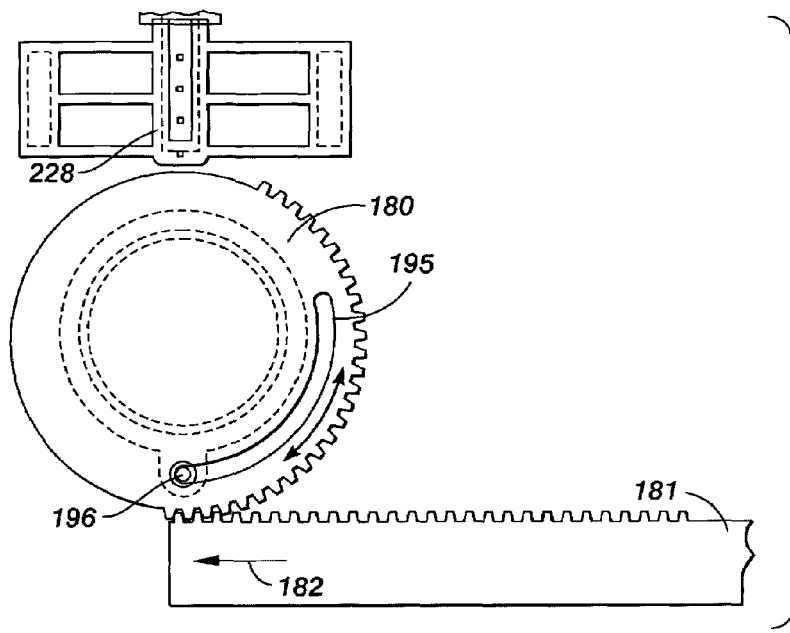
FIG. 20 depicts a gear tooth cam style actuator mechanism for micro-misalignment with a stop slot and pin.
Figure 21:
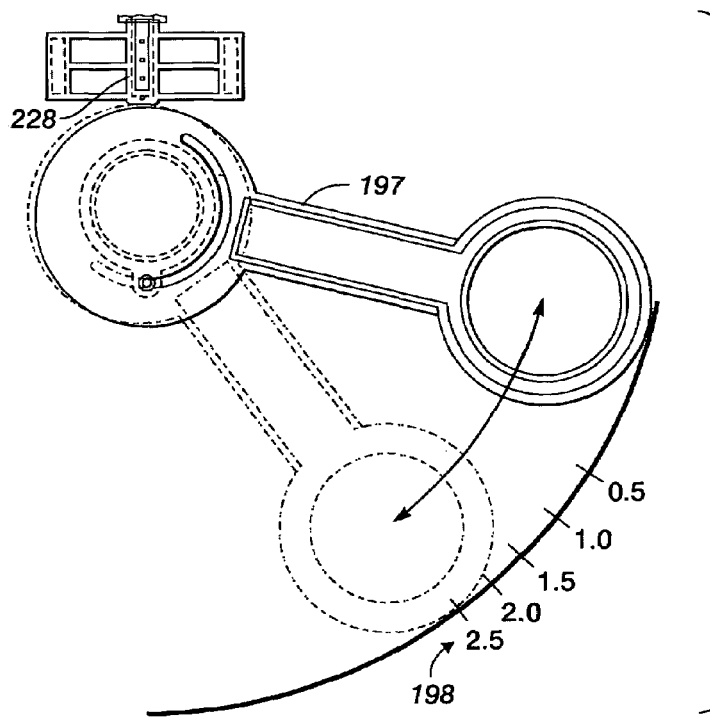
FIG. 21 depicts a lever rod cam style actuator mechanism for micro-misalignment.

FIG. 20 provides depiction of an embodiment essentially the same as that provided in FIGS. 18 and 19 but with the addition of a range limiting slot 195 and stop pin 196. FIG. 21 is much the same but the cam can be driven individually via connector rod 197 with readings 198 indicating the traveling distance of the linkage 228.

Figure 22:
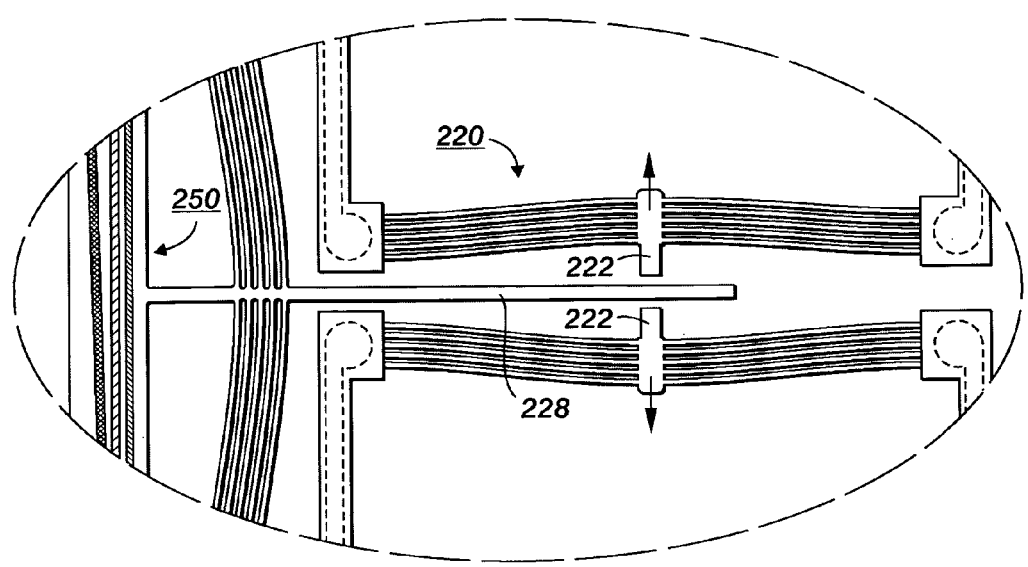
FIG. 22 shows an alternative embodiment arrangement relying upon friction.
Figure 23:
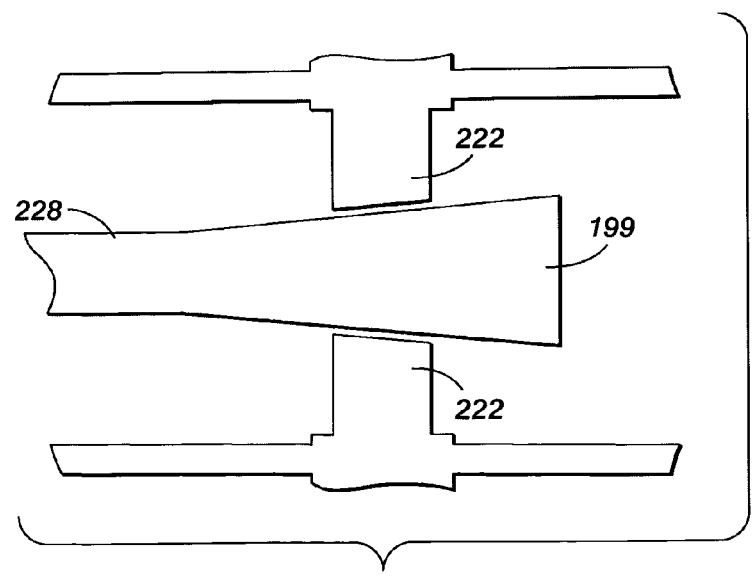
FIG. 23 depicts and adjunct to the embodiment of FIG. 22 when the coefficient of friction is insufficient.

As will be well understood by those skilled in the art, there are many ways in which to actuate and provide micro-incremental misalignment, and indeed in FIG. 22 there is depicted yet a further embodiment employable where sufficient coefficients of friction are provided. Here teeth 222 are brought to bear directly upon linkage 228. Typically the MEMS structures shown herein are made using deep reactive ion etching (DRIE) on single crystalline silicon or silicon on insulator (SOI) wafers. The etching gas can be $SF_6$, $C_4F_8$, $Cl_2$, or combination of these gases. For example, the chlorine etching can create vertical roughness (i.e. the roughness pattern is vertical to the wafer face), whereas Bosch process (using $SF_6$, $C_4F_8$) can create horizontal roughness. For these embodiments, a chlorine process is chosen to create vertical roughness for better friction force. In addition, the etchant gas concentration may be varied, as well as the etching temperatures and gas flow rates for optimized roughness so as to increase the friction coefficient and thereby enhance the tune-ability. FIG. 23 provides linkage 228 with a dovetail structure 199 that can enhance the clamping operation where the friction coefficient is insufficient.

The invention may be embodied in other specific forms without departing from its spirit or essential characteristics. The described embodiments are to be considered in all respect only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A micro-electro-mechanical optical switch and variable optical attenuator, comprising:
   a first fixed optical waveguide for selection;
   a second fixed optical waveguide for selection;
   a movable waveguide shuttle further comprising an optical waveguide which may be brought into substantial alignment with either the first fixed optical waveguide as selected or in the alternative the second fixed optical waveguide as selected;
   an actuator micro-incrementally misaligning the movable waveguide shuttle thus correspondingly micro-incrementally misaligning the movable optical waveguide relative to the selected first or second fixed optical waveguide; and
   a latch that will hold by way of the actuator, the movable optical waveguide as positionally micro-incrementally misaligned relative to the selected first or second fixed optical waveguide, in a manner such that any optical signal passing through the selected first or second fixed optical waveguide and movable waveguide is attenuated.

2. The micro-electro-mechanical optical switch and variable optical attenuator provided in claim 1, wherein the latch is provided with a plethora of latching teeth.

3. The micro-electro-mechanical optical switch and variable optical attenuator provided in claim 1, wherein the latch is provided with latching teeth having stair-step mating faces.

4. The micro-electro-mechanical optical switch and variable optical attenuator provided in claim 1, wherein the latch is provided with a wedge block.

5. The micro-electro-mechanical optical switch and variable optical attenuator provided in claim 4, wherein the wedge block is provided with facets.

6. The micro-electro-mechanical optical switch and variable optical attenuator provided in claim 4, further comprising a return spring.

7. The micro-electro-mechanical optical switch and variable optical attenuator provided in claim 1, wherein the latch is provided with a cam.

8. The micro-electro-mechanical optical switch and variable optical attenuator provided in claim 1, wherein the latch is provided with a cam having facets.

9. The micro-electro-mechanical optical switch and variable optical attenuator provided in claim 7, wherein the cam is provided with a range limiting slot.

10. A micro-electro-mechanical system optical switch with integral variable optical attenuator, comprising:
    two or more fixed optical waveguides;
    a movable waveguide shuttle further comprising an optical waveguide which may be alternatively switched into substantial alignment exclusively with any selected one of the two or more fixed optical waveguides;
    an actuator for switching the movable waveguide shuttle to a selected one of the two or more fixed optical waveguides and further capable of micro-incrementally misaligning the movable waveguide shuttle relative to the selected one of the two or more fixed optical waveguides; and
    a latch that will hold the movable waveguide shuttle as micro-incrementally misaligned by the actuator, relative to the selected one of the two or more fixed optical waveguides, in a manner such that any optical signal passing through is attenuated by some variably desired amount.

11. The micro-electro-mechanical system optical switch with integral variable optical attenuator provided in claim 10, wherein the latch is provided with a plethora of latching teeth.

12. The micro-electro-mechanical system optical switch with integral variable optical attenuator provided in claim 10, wherein the latch is provided with latching teeth having stair-step mating faces.

13. The micro-electro-mechanical system optical switch with integral variable optical attenuator provided in claim 10, wherein the latch is provided with a wedge block.

14. The micro-electro-mechanical system optical switch with integral variable optical attenuator provided in claim 13, wherein the wedge block is provided with facets.

15. The micro-electro-mechanical system optical switch with integral variable optical attenuator provided in claim 13, further comprising a return spring.

16. The micro-electro-mechanical system optical switch with integral variable optical attenuator provided in claim 10, wherein the latch is provided with a cam.

17. The micro-electro-mechanical system optical switch with integral variable optical attenuator provided in claim 10, wherein the latch is provided with a cam having facets.

18. The micro-electro-mechanical system optical switch with integral variable optical attenuator provided in claim 16, wherein the cam is provided with a range limiting slot.

* * * * *

UNITED STATES PATENT AND TRADEMARK OFFICE
CERTIFICATE OF CORRECTION

PATENT NO. : 7,298,954 B2  
APPLICATION NO. : 11/154019  
DATED : November 20, 2007  
INVENTOR(S) : Liu et al.

Page 1 of 1

It is certified that error appears in the above-identified patent and that said Letters Patent is hereby corrected as shown below:

In the Specification:

Column 1, line 23, please insert --STATEMENT REGARDING FEDERALLY SPONSORED RESEARCH OR DEVELOPMENT This invention was made with United States Government support under Cooperative Agreement No. 70NANB8H4014 awarded by the National Institute of Standards and Technology (NIST). The United States Government has certain rights in the invention.-- as a separate paragraph before the heading "BACKGROUND AND SUMMARY".

Signed and Sealed this  
Twelfth Day of August, 2014

Michelle K. Lee  
*Deputy Director of the United States Patent and Trademark Office*